May 26, 1959   R. D. HOCHSTETLER ET AL   2,887,884
GYROSCOPE CAGING SYSTEM
Filed Jan. 7, 1957                                              2 Sheets-Sheet 1

INVENTOR
Robert D. Hochstetler
Irwin B. Thierman
BY
AGENT

May 26, 1959 R. D. HOCHSTETLER ET AL 2,887,884
GYROSCOPE CAGING SYSTEM
Filed Jan. 7, 1957 2 Sheets-Sheet 2
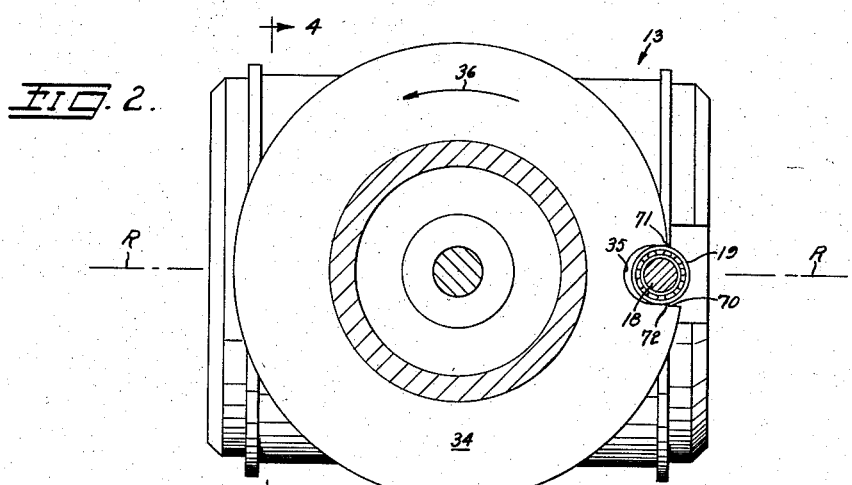
FIG. 2.
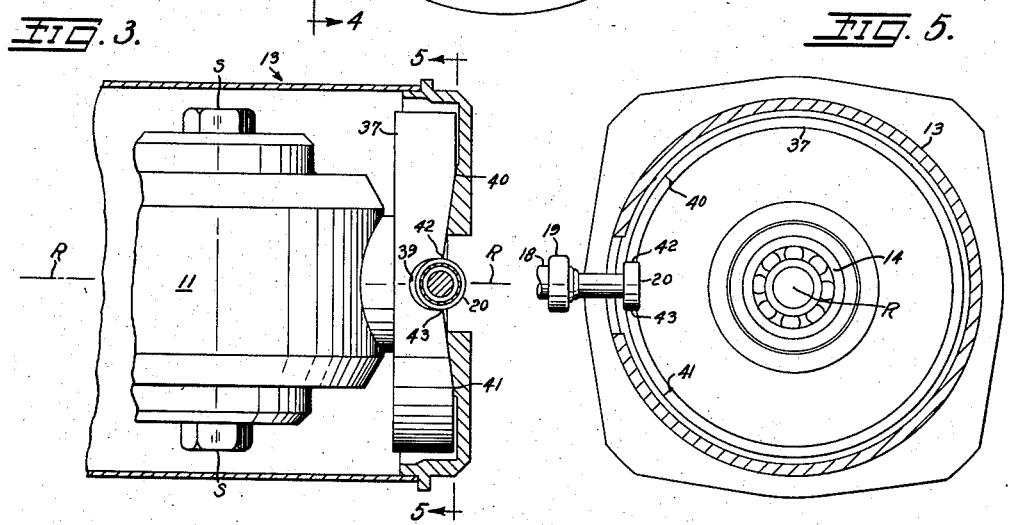
FIG. 3.
FIG. 5.
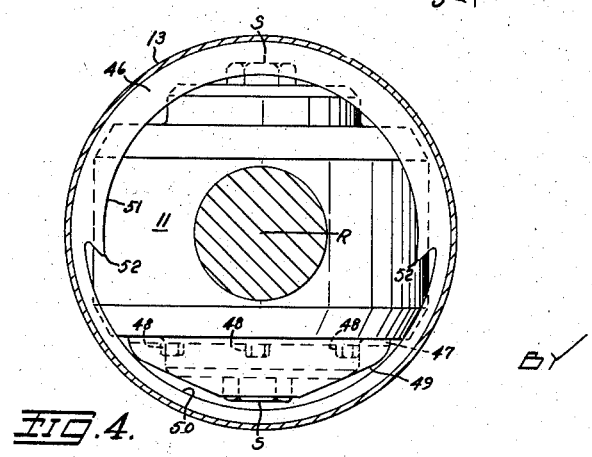
FIG. 4.
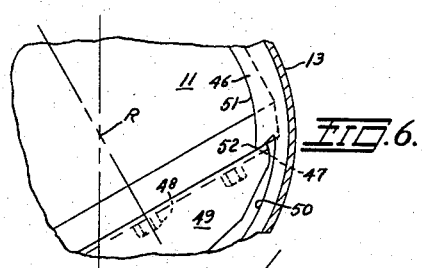
FIG. 6.
INVENTOR
Robert D. Hochstetler
Irwin B. Thierman
BY
AGENT United States Patent Office 2,887,884
Patented May 26, 1959

2,887,884

GYROSCOPE CAGING SYSTEM

Robert D. Hochstetler, Beaverton, and Irwin B. Thierman, Portland, Oreg., assignors to Iron Fireman Manufacturing Company, Portland, Oreg., a corporation of Oregon Application January 7, 1957, Serial No. 632,755

8 Claims. (Cl. 74—5.1)

This invention relates generally to gyroscopes and more particularly to improved means for rapidly caging a gyroscope when desired and for freeing both gimbal rings at exactly the same instant to restore to the gyroscope its complete freedom at a desired instant.

One gyroscope for which the present system is adapted would include an air frame on which an outer gimbal ring is carried freely to rotate on an axis parallel to the vertical or yaw axis of the air frame, an inner gimbal ring or rotor case carried on the outer gimbal ring freely to rotate about an axis parallel to the roll axis of the air frame, a rotor and means for spinning the rotor carried on the inner gimbal ring or rotor case freely to rotate on a spin axis parallel to the pitch axis of the air frame.

For purposes of clear disclosure the system in which the invention is practiced will here be shown as including a gyroscope positioned as above described for a yaw gyroscope. In certain important uses such a gyroscope is given only the duty of sensing for a short interval of time the angular divergence of the air frame about the yaw axis from a chosen forward direction of the air frame in space. The gyro will require no erection system as usually understood but will require a caging system which will rapidly cage the gyro when desired and when the air frame has been set on a desired forward path will instantaneously and simultaneously release both gimbal rings to free movement about their respective mounting axes.

By caging the yaw gyro shown is meant so positioning the outer and inner gimbal rings about their respective axes of freedom that the axis of freedom of the inner gimbal ring will be parallel with the forward direction or roll axis of the air frame and the rotor or spin axis will be parallel with pitch axis of the air frame, both the roll and pitch axes being in the same plane perpendicular to the yaw or vertical axis of the air frame which in the present case would only by chance be a gravity vertical.

From the above it is plain that the principal objects of this invention are, first, to provide means for quickly caging a gyroscope when it is necessary to do so and, second, to provide precision means for releasing both of the gimbal rings from their caged conditions at the same instant in order that no precession bias will be given either of the gimbal rings when the gyro is given its freedom about all its axes.

How these and other objects are attained will be explained in the following description referring to the attached drawings in which:

Fig. 2 is a plan view along the line 2—2 of Fig. 1 showing certain functional elements of the system.

Fig. 3 is a fragmental plan view in partial section along the line 3—3 of Fig. 1 showing certain other functional elements of the system.

Fig. 4 is a sectional view along the line 4—4 of Fig. 2.

Fig. 5 is a sectional view along the line 5—5 of Fig. 3.

Fig. 6 is a fragmentary view similar to Fig. 4 but with certain parts shown in a different functional relation.

In Figs. 1 to 5 the gyroscope of the system is shown in its caged condition.

Figure 7:
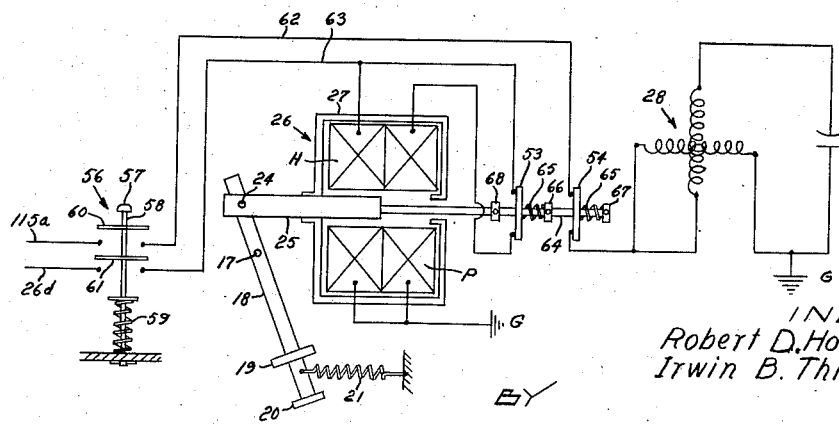
Fig. 7 is a convention drawing of the operating scheme of the electrical parts of the system.

In Fig. 7 the electrical parts are shown in their schematic interrelation when the gyroscope is uncaged or free.

In Fig. 6 certain parts are shown in position during part of the caging process.

Like numerals of reference refer to like parts in the several figures of the drawings.

Figure 1:
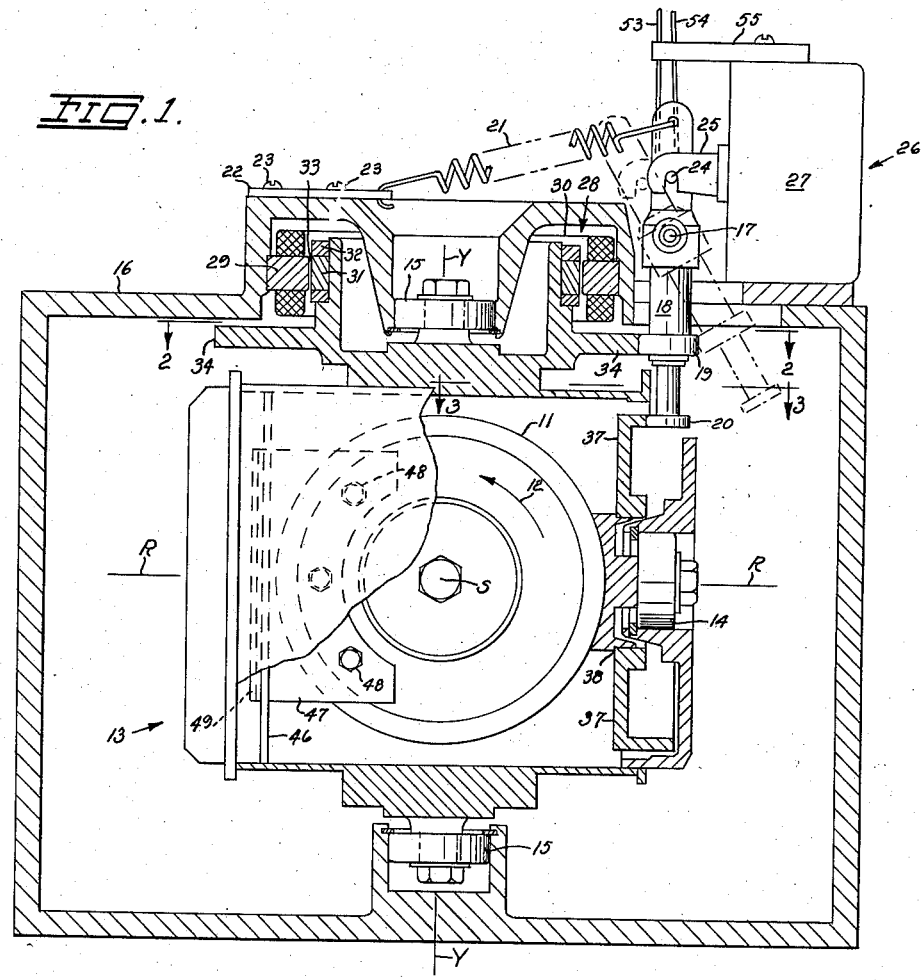
Fig. 1 is a side elevation view in partial section emphasizing essential elements of the present system including the gyroscope.

Referring now to the drawings there is shown an inner gimbal ring or rotor case 11 within which on a spin axis S the gyroscope rotor, not shown, is assumed to be driven at constant speed by motor means, not shown, to spin in the direction shown by the arrow 12 in Fig. 1.

Inner gimbal 11 is indicated to be carried on outer gimbal ring 13 by two bearings 14, one shown, freely to rotate about the axis R—R.

Outer gimbal ring 13 is supported as shown by bearings 15 on frame 16 freely to rotate about axis Y—Y. Frame 16 is either part of or secured to the air frame whose condition of yaw is to be sensed.

The spin axis S is parallel to the pitch axis of the air frame.

The R axis is parallel to roll axis or forward direction of the air frame.

The Y axis is parallel to the vertical or yaw axis of the air frame.

Pivoted on frame 16 at 17 is caging lever 18 carrying on its lower end spaced ball bearing rollers 19 and 20. Tension spring 21 is strained as shown between plate 22 secured to frame 16 by screws 23 and the upper end of lever 18 to bias lever 18 about its pivot axis 17 in a counterclockwise direction as viewed in Fig. 1. Pin 24 secured to the upper end of lever 18 is engaged as shown by armature 25 of 26 volt D.C. solenoid 26 whose case 27 sits on frame 16 as shown and is secured thereto by means not shown. In Fig. 1 solenoid 26 is shown as energized and having overcome the bias of spring 21 to move lever 18 to its position when the gyroscope is caged. When the solenoid 26 is deenergized lever 18 is moved by spring 21 to its dotted position shown in Fig. 1.

115 volt single phase A.C. torquer motor 28 has its stator iron 29 secured in frame 16 as shown. Stator winding 30 is interlaced with iron circuit 29 as indicated. Rotor iron 31 and its winding 32 is shown to be carried on outer gimbal ring 13 separated from stator iron 29 by air gap 33.

Secured on outer gimbal 13 is lock disk 34 as shown in Figs. 1 and 2. At one position on its periphery disk 34 is formed with a deep notch 35 only slightly wider than roller 19 which is shown to be resting therein. When torquer motor 28 is energized it urges outer gimbal 13 and disk 34 to rotate counterclockwise as shown by arrow 36 in Fig. 2. It should be noted that disk 34 is reduced in diameter for a short distance in the direction of arrow 36 from slot 35 so that if roller 19 is out of slot 35 and pressed against the outer edge of disk 34 by spring 21 then as motor 28 rotates disk 34 in the direction of arrow 36 disk 34 will surely be stopped by its extension 70 at the trailing side of slot 35 striking roller 19 and lever 18 will come to rest with roller 19 in slot 35.

Cam ring 37 pressed securely on inner gimbal ring 11 as shown at 38 in Fig. 1 is seen also in Figs. 3 and 5 to have a notch 39 formed in one edge thereof to receive roller 20 of lever 18. The same edge of ring 37 is seen to be tapered from the full width of the ring at points 40 and 41 on either side of notch 39 to a narrower width of ring 37 at points 42, 43 on either side of notch 39.

The edge surfaces from point 40 to point 42 and from point 41 to point 43 function as cam surfaces for which roller 19 of lever 18 functions as a follower to urge ring 37 and inner gimbal ring 11 from either direction toward its position of receiving roller 19 into notch 39 whenever roller 19 is riding either of the cam surfaces and biased theretoward by spring 21.

As seen in Figs. 1, 4 and 6, notched washer 46 is secured within outer gimbal ring 13 transversely thereof and stop plate 47 is secured to inner gimbal ring 11 by screws 48. Stop plate 47 is perpendicular to washer 46 and extends therethrough with flange 49 of plate 47 bent over parallel to washer 46 to stiffen plate 47. It should be noted that washer 46 has a section 50 of larger internal radius and a section 51 of smaller internal radius separated one from the other by a pair of transition sections forming stops 52 in the path of plate 47 secured to inner gimbal ring 11 to rotate therewith, as shown in Fig. 6. Thus stops 52 limit the angular rotation of inner gimbal 11 with respect to outer gimbal ring 13 to less than the angular distance between points 40 and 41 of cam ring 37 secured to inner gimbal 11.

Switch blades 53 and 54, insulatedly supported on solenoid 26 by bar 55, are shown in approximate position in Fig. 1. Although their operating mechanism is not shown in detail it is to be understood that both switches are normally closed and operated to open position by armature 25 of solenoid 26 when solenoid 26 is energized and both gimbal rings are caged. To keep the drawings uncluttered the electrical circuitry which is germane to the invention is omitted from Figs. 1 to 6 and shown schematically in Fig. 7 where most of the reference numbers refer to the schematic representation of parts shown in actual position in Figs. 1 to 6.

In Fig. 7 line 115A leads from a source of 115 volt single phase A.C. power and line 26D leads from a source of 26 volt D.C. power. Caging switch 56 is indicated to include a manually operated push button 57 carried on insulated stem 58 biased upwardly by spring 59 and carrying conducting switch bars 60, 61, adapted when button 57 is depressed to connect line 115A to line 62 and line 26D to line 63.

Torquer motor 28 is seen to be connected between line 62 and ground by switch bar 54 when solenoid 26 is deenergized and spring 21 biases lever 18 in a counterclockwise direction to withdraw armature 25, insulatedly connected to switch bars 53, 54, from solenoid 26. Solenoid 26 is seen to include a holding coil H and a pull in coil P. Pull in coil P is seen to be connected between line 63 and ground G through switch bar 53. Holding coil H is seen to be connected directly between line 63 and ground G.

For purposes of functional explanation only in Fig. 7 armature 25 of relay 26 is shown as having secured thereto in axial alinement therewith an insulating rod 64 on which switch bars 53, 54 are slidably positioned. In the unenergized condition of relay 27, as shown bars 53, 54 are held against their respective stationary contacts by springs 65 backed up by insulating stops 66, 67.

It will be remembered that when solenoid 26 is energized to initiate the caging operation, armature 25 is prevented from completing its throw by the striking of rollers 19 and (or) 20 on lock disk 34 or ring cam 37 respectively away from notches 35 or 39 respectively. Then as the caging operation progresses rollers 19 and 20 will in their proper sequence fall into notches 35 and 39 and lever 18 will allow armature 25 to finish its stroke into solenoid 26 at which time stops 68 and 66 on rod 64 will strike switch bars 53, 54 respectively and move both of them away from their respective stationary contacts to deenergize pull in coil P and motor 28 but leave holding coil H energized to maintain the caged position of the gyroscope until push button 57 is released to disconnect lines 62, 63 respectively from lines 115A and 26D.

With the above explanation of the apparatus involved, its use in caging and uncaging the gyroscope can be given as follows. When the air frame is headed on the flight path from which its deviation in flight is to be sensed push button 57 is held down so that lines 62, 63 are energized from lines 115A and 26D by caging switch 56; torquer motor 28 is energized from line 62 through switch 54; holding coil H is energized directly from line 63 and pull in coil P is energized from line 63 through switch 53.

When torquer motor 28 is energized it urges outer gimbal ring 13 to rotate about axis Y—Y which instantly causes inner gimbal ring 11 to precess about the axis R—R until stop plate 47 of inner gimbal ring 11 strikes one of the stops 52 of notched washer 46 of outer gimbal ring 13 as shown in Fig. 6.

When stop plate 47 strikes stop 52 the stiffness vanishes from the gyroscope and torquer motor 28 immediately rotates outer gimbal 13 in the direction 12 until extending lip 70 of notch 35 strikes roller 19 allowing roller 19 to advance into notch 35 under the bias of spring 21 on lever 18 until roller 20 strikes one of the cam surfaces of cam ring 37 at which time the pressure of roller 20 on cam ring 37 causes inner gimbal ring 11 to rotate about axis R—R in the direction to bring notch 39 under roller 20.

As notch 39 finds roller 20 and roller 20 drops into notch 39 under the magnetic bias of solenoid 26 on its armature 25 armature 25 completes its stroke and in so doing opens switches 53, 54 as above explained to deenergize motor 28 and pull in coil P.

The gyroscope now having been caged quickly it is in a condition to be freed quickly at whatever instant it is desired to have the gyroscope take up its duty of sensing the angular deviation of the flight path of the air frame from that at which it is released for free operation. And for the purpose for which it is used it should be understood that it is a requirement that in uncaging or freeing the gyroscope both gimbal rings must be freed at exactly the same instant to prevent the last freed gimbal ring from giving a precessing torque to the first freed gimbal ring. In this respect it is particularly noted that both rollers 19 and 20 are in axial alinement and that the common axis of both rollers 19 and 20 is in a plane including the axis of pivot 17 of lever 18.

Again it is particularly noted that the outer limits 42, 43 of notch 39 in cam ring 37 and the outer limits 71, 72 of notch 35 in lock disk 34 are in that same plane when the plane is rotated about the axis of pivot 17 of lever 18 to include them.

It is then seen that at the desired instant when push button 57 of caging switch 56 is released, holding coil H will be deenergized and spring 21 will rotate lever 18 with rollers 19 and 20 in the direction about pivot 17 to release both of the gimbal rings 11 and 13 for complete freedom about their respective R—R and Y—Y axes at exactly the same instant.

It is believed that nowhere in the prior art is found the conception and the means for exploiting the conception of limiting the rotation of one gimbal ring about its axis of freedom to the least requirement of angular freedom; using a troquer motor on the other gimbal ring to precess the one gimbal ring to a stop; then to use the torquer motor rapidly to cage the other ring from any angular distance up to 360 degrees; and finally to cam the one gimbal ring the short distance required to cage it from either direction.

It is believed that nowhere in the prior art is found the conception and the means for exploiting the conception of using a single action locking lever to lock one gimbal ring in its caged position, cam the other gimbal ring to its caged position and lock it there and thereafter at a desired instant precisely simultaneously to release both gimbal rings to complete freedom about their respective axes of freedom.

Having thus recited some of the objects of our invention, illustrated and described a favored method of practicing our invention and explained its operation, we claim:

1. A gyroscope caging system including a gyroscope together with caging means for rapidly caging and precisely uncaging said gyroscope; said gyroscope including a frame, an outer gimbal ring rotatably carried on said frame to rotate about a first axis fixed in position relative to said frame, an inner gimbal ring rotatably carried on said outer gimbal ring to rotate about a second axis normal to said first axis, a rotor rotatably carried on said inner gimbal ring to rotate about a third axis normal to said second axis, means for spinning said rotor in one direction about said third axis, each one of said axis intersecting each other of said axes at a common point; said gyroscope being said to be caged when said three axes are held in mutually perpendicular relation; said caging means including a lever pivoted on said frame on a pivot axis parallel to the caged position of said third axis, the axis of said lever being normal to said pivot axis in a plane including said pivot axis, a first circular latch means rotatably carried on said lever coaxially therewith, a second circular latch means rotatably carried on said lever coaxially therewith, said second latch means being axially spaced from said first latch means, a lock disk secured to said outer gimbal ring to rotate therewith, a cylindrical cam ring secured to said inner gimbal ring to rotate therewith, said lock disk being formed on its outer edge with a first notch for receiving said first latch means when said second axis is at a predetermined angular position about said first axis, said cylindrical cam ring being formed on one end edge with a second notch for receiving said second latch means when said third axis is normal to said first and second axes, means for sequentially moving each of said notches into alinement with a respective one of said latch means, means for moving each of said latch means into its respective one of said notches and means for precisely simultaneously releasing said two latch means from their respective notches.

2. The system of claim 1 in which said means for precisely simultaneously releasing said two latch means from their respective notches includes abrupt entrance corners formed on each side of each of said notches and biasing means for biasing said lever towards movement of said latch means out of said notches, all of said corners being positioned in said lever plane when said lever plane is rotated to a predetermined position about said pivot axis whereby as the plane of said lever is moved outwardly away from said notches each of said circular latch means will leave its respective notch at precisely the same instant.

3. The system of claim 2 in which said means for sequentially moving each of said notches into alinement with a respective one of said latch means includes electric motor means for rotating said outer gimbal ring in one direction only about said first axis and stop means cooperatively formed on said frame and said outer gimbal ring for stopping said outer gimbal ring when it has been rotated by said motor means to a position of alinement of said first latch means with said notch in said lock disk.

4. The system of claim 3 in which said means for sequentially moving each of said notches into alinement with a respective one of said latch means includes said second latch means, a pair of cam surfaces formed one on either side of said second notch on said one end edge of said cam ring and said electric means for overcoming the bias of said biasing means, whereby when said first latch means is engaged in said first notch and said second latch means is pressed against one of said pair of cam surfaces by said electric means said inner gimbal ring will be rotated towards its position of engagement of said second notch by said second latch means.

5. The system of claim 4 in which said means for sequentially moving each of said notches into alinement with a respective one of said latch means includes stop means cooperatively formed on said outer gimbal ring and said inner gimbal ring to limit the rotation of said inner gimbal ring with respect to said outer gimbal ring to an angular displacement of said second notch in either direction from said second latch to less than the angular extent of said cam surfaces on said cam ring from said second latch.

6. The system of claim 5 in which said means for caging said gyroscope includes means for energizing said electric means for overcoming the bias of said biasing means to press said first latch means against the edge of said lock disk and press said second latch means towards one of said cam surfaces and simultaneously energizing said electric motor means for rotating said outer gimbal ring, whereby when torque is exerted by said electric motor means on said outer gimbal said inner gimbal will precess to one of its stop positions, said outer gimbal will rotate to its caged position, said lever will move to drop said first latch means in said first notch, said second latch means will drop against one of said cams and the pressure of said second latch means on said one of said cams will rotate said inner gimbal ring to its caged position.

7. A caging system for a gyroscope, said gyroscope including a rotor rotatingly supported in an inner gimbal ring about a third axis, said inner gimbal ring being rotatably supported in an outer gimbal ring for rotation about a second axis perpendicular to said third axis, said outer gimbal ring being supported in a frame for rotation about a first axis perpendicular to said second axis, said gyroscope being said to be caged when said three axes are held in mutually perpendicular relation, and said caging means including a lock disk secured to said outer gimbal ring to rotate therewith, a cam means secured to said inner gimbal ring to rotate therewith, said lock disk being formed with a first notch, said cam means being formed with a second notch, a first latch means supported on said frame for engagement in said first notch of said lock disk when said second axis is at a pre-determined angular position about said first axis, a second latch means supported on said frame for engagement in said second notch of said cam means when said third axis is normal to said first and second axes, means for sequentially rotating said outer gimbal ring to precess said inner gimbal ring to a stop then rotating said outer gimbal ring to a position for engagement of said first latch means with said first notch then engaging said second latch means with said cam means for rotating said inner gimbal ring to a position of engagement of said second latch means with said second notch then latching said respective latch means in said respective notches, and means for precisely simultaneously releasing said two latch means from their respective notches.

8. A caging system for a gyroscope, said gyroscope comprising a spinning rotor supported in a frame by a two gimbal ring system having freedom about three axes which are mutually perpendicular when said gyroscope is caged, and said system comprising stop means for limiting the rotation of one of said gimbal rings about one of said axes to a first preset angular position, motor means for applying torque to the other of said gimbal rings about another of said axes to precess said one of said gimbal rings into contact with said stop means and thereafter to rotate said other gimbal ring to a second preset angular position about said other axis, and cam means for rotating said one of said gimbal rings from contact with said stop means to a position of perpendicularity of the third of said axes with said one and said other axes, together with means for locking said other gimbal ring in said second preset angular position about said other axis, means for locking said one gimbal ring in said position of perpendicularity of the third of said axes with said one and said other axes, and means for precisely and simultaneously releasing both said gimbal rings from their said locked positions.

References Cited in the file of this patent
UNITED STATES PATENTS

| | | |
|---|---|---|
| 2,580,748 | Fillebrown | Jan. 1, 1952 |
| 2,674,891 | Konet et al. | Apr. 13, 1954 |